Patented July 15, 1952

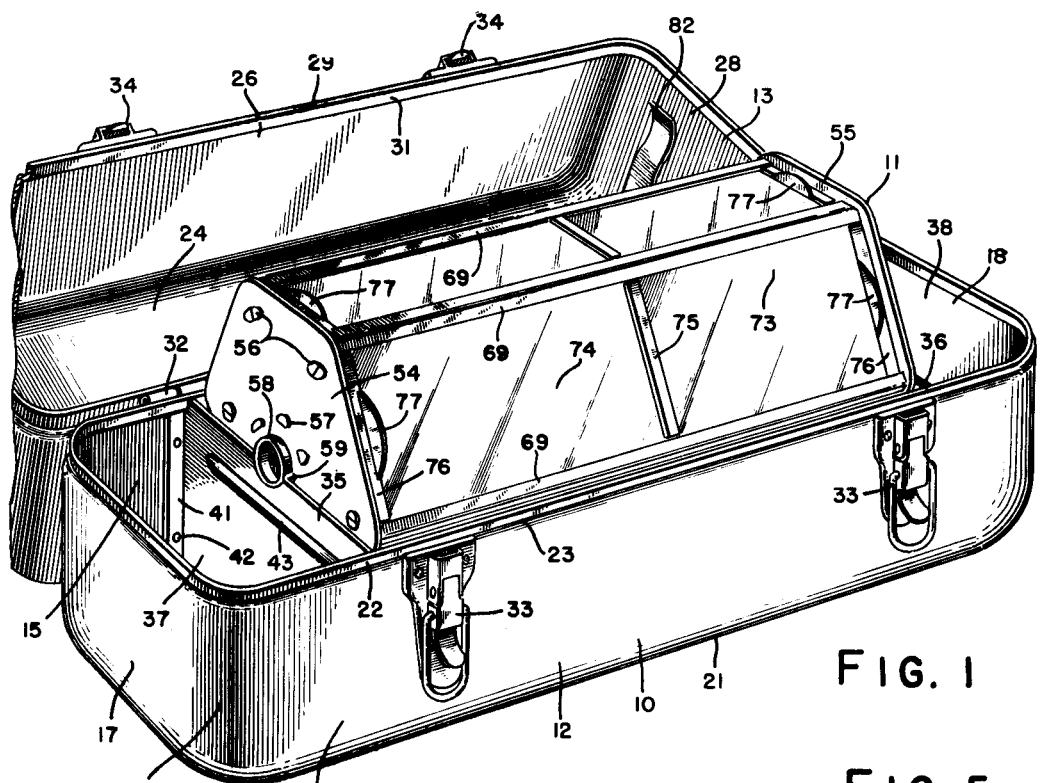
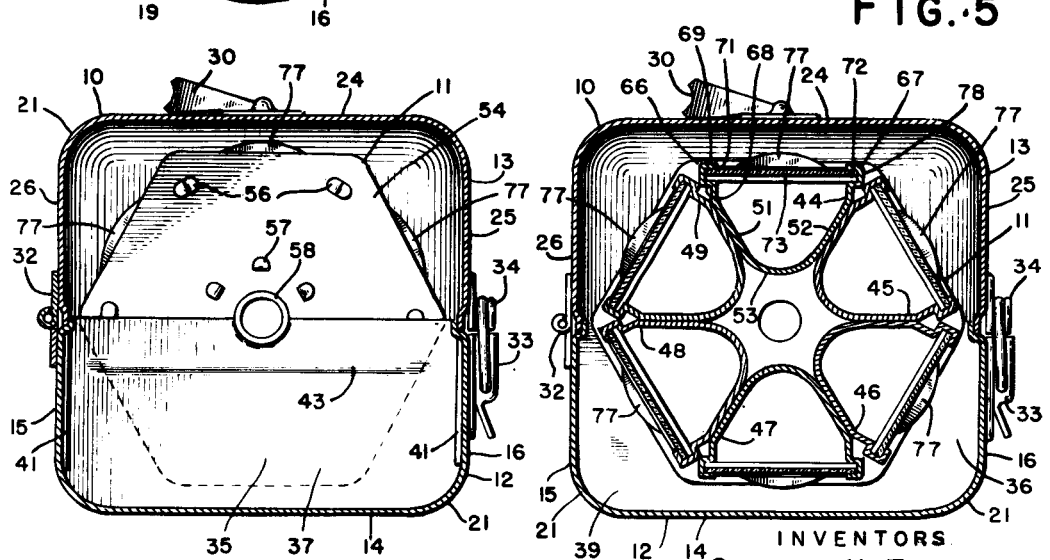

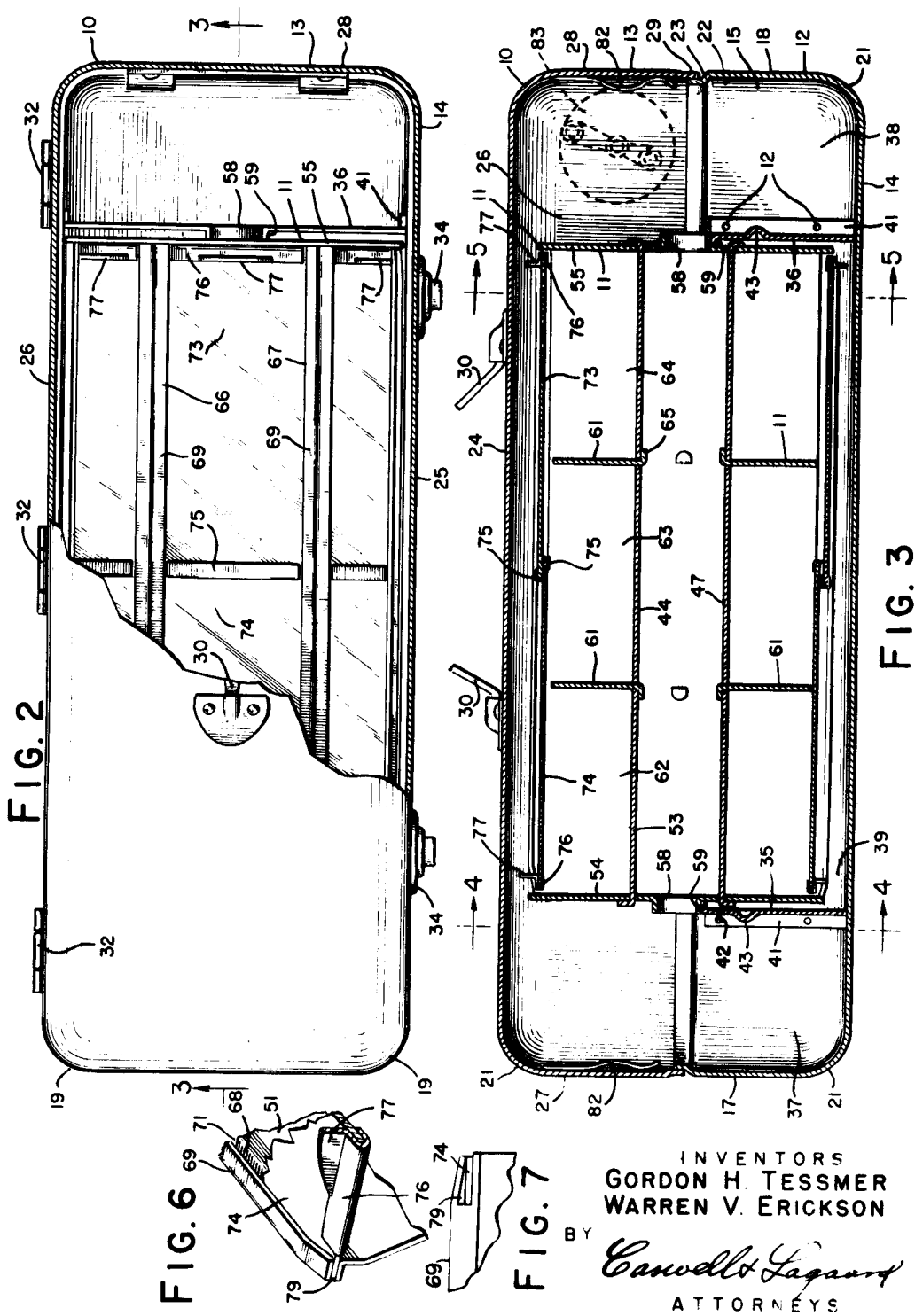

2,603,549

UNITED STATES PATENT OFFICE 2,603,549

TACKLE BOX WITH REVOLVING RECEPTACLE

Gordon H. Tessmer and Warren V. Erickson, Minneapolis, Minn.

Application November 25, 1946, Serial No. 712,134

4 Claims. (Cl. 312—300)

Our invention relates to tackle boxes and has for an object to provide a highly useful and practical tackle box.

Another object of the invention resides in providing a tackle box having numerous individual compartments in which fishing tackle and supplies may be kept and in which the same are held apart to prevent tangling and injury to the same.

Another object of the invention resides in providing a tackle box in which the contents of the various compartments may be readily made visible to the user.

A still further object of the invention resides in providing a tackle box with a case having a lower half and an upper half adapted to be opened to give access to the interior or to be closed to enclose the contents of the box.

A still further object of the invention resides in providing partitions extending across the lower half of the case and spaced from the end walls thereof to provide end compartments in the case and an intermediate space therebetween.

Another object of the invention resides in providing a revoluble container within the space between said partitions.

A feature of the invention resides in constructing the partitions with bearings and the container with trunnions journaled for rotation in the bearings, said bearings being open at the top to permit of insertion into and removal of the container from the case.

A still further object of the invention resides in constructing the container with a number of trays arranged about the axis of the container and having juxtaposed radial walls and curved bottom walls connected therewith.

A feature of the invention resides in constructing the container with end walls to which the trays are secured.

An object of the invention resides in providing U-shaped guides at the outer edges of the radial walls of the trays and having facing grooves and in further providing closures slidable along said grooves to open or close the outer portions of the said trays.

Another object of the invention resides in providing at the ends of the upper half of the case, clips for attaching articles to the upper half of the case whereby the space above the end compartments in the lower half of the case may be utilized.

Other objects of the invention reside in the novel combination and arrangement of parts and in the details of construction hereinafter illustrated and/or described.

In the drawings:

Fig. 1 is a perspective view of a tackle box illustrating an embodiment of our invention and showing the case open.

Fig. 2 is a plan view of the tackle box with the case closed and with portions of the upper half of the same broken away to show the interior construction of the box.

Fig. 3 is an elevational sectional view taken on line 3—3 of Fig. 2.

Fig. 4 is a cross-sectional view taken on line 4—4 of Fig. 3.

Fig. 5 is a cross-sectional view taken on line 5—5 of Fig. 3.

Fig. 6 is a perspective view of a portion of one of the trays of the container removed from the case.

Fig. 7 is a fragmentary elevational view of one of the guides of the invention.

Our improved invention includes a case indicated in its entirety at 10 and in which is disposed a revoluble container 11. The container 11 is arranged so that the same may be rotated to display the various articles contained within the same and so that said container may be easily removed from the case whenever desired. These various parts will now be described in detail.

The case 10 consists of a lower half 12 and an upper half 13. The lower half 12 comprises a bottom 14, side walls 15 and 16 and end walls 17 and 18. These parts are preferably stamped from sheet material and in the form of the invention shown, are integral, having rounded corners 19 between the side and end walls of the case and other rounded corners 21 between the bottom and side and end walls of the case. At the upper edges of the side and end walls is formed an offset 22 connected to the side and end walls by means of a ledge 23. The upper half 13 of the case is similarly constructed being formed with a top 24, side walls 25 and 26 and end walls 27 and 28. The upper edges of the side and end walls are formed with an offset 29 extending inwardly from the walls of the case. The offset 29 of the upper half 13 is adapted to be received within the offset 22 of the lower half 12 as best shown in Figs. 3 and 4. For connecting the two halves 12 and 13 together, hinges 32 are employed which are secured to the walls 15 and 26 of the two halves 12 and 13 respectively. Fastener members 33 secured to the wall 16 cooperate with complemental fastener members 34 which are secured to the wall 26. By means of this construction, the two halves of the case may be locked in closed position. A handle 30 is secured to the top wall 24 of the upper half 13 of case 10 by means of which the box may be conveniently carried about.

Within the half 12 of the case 10 are mounted two transverse partitions 35 and 36 which are disposed inwardly from the end walls 17 and 18 to form end compartments 37 and 38 between said partitions and the end walls 17 and 18 and an intermediate space 39 therebetween. These partitions have flanges 41 bent outwardly therefrom which lie along the walls 15 and 16 and which are secured thereto by means of rivets 42. The uppermost portion of each of these flanges is provided with a rib 43 which is struck outwardly therefrom and which extends transversely across the upper portion of each of said partitions. These ribs greatly stiffen and reinforce the partitions.

Within the space 39 is disposed the container 11. This container comprises a number of trays 44, 45, 46, 47, 48 and 49. All of these trays are identical in construction and only the tray 44 will be described in detail. This tray is constructed from sheet material which is bent to form two radial walls 51 and 52 connected together by means of a curved bottom wall 53. For supporting the various trays, two end walls 54 and and 55 are employed which are hexagonal in form and which close the ends of the trays 44, 45, 46, 47, 48 and 49. The said trays are so arranged that the walls 51 and 52 of the said trays are disposed in juxtaposed position and so that the said trays are arranged about the axis of the revoluble container 11. The trays are attached to the end walls 54 by means of ears 56 struck out from the ends of the radial walls 51 and 52 and ears 57 struck out from the curved bottom wall 53. These ears extend out through the end walls 54 and are bent over as best shown in Figs. 1 and 4.

The container 11 is supported for rotation in the following manner: Extending outwardly from the end walls 54 and 55 are trunnions 58 which are formed by cupping the material of the said end walls in a suitable press. These trunnions are rotatably mounted in bearings 59 formed on the partitions 35 and 36. These bearings are formed in much the same manner as the trunnions 58 but extend in the opposite direction. The said bearings are half bearings being open at the upper portions of the same and the trunnions 58 merely rest freely in the same. By means of this construction, the container 11 may be conveniently rotated within the lower half 12 of the case 10 when the upper half 13 is moved back into the position shown in Fig. 1. Also, the container 11 may be entirely removed from the case when desired.

Extending across certain of the trays 44, 45, 46, 47, 48 and 49 are dividers 61 which divide the space within said trays into compartments 62, 63 and 64. These dividers have ears 65 which extend through the trays and which are bent over to hold the said dividers in proper position.

The various trays of the container 11 are closed by means of the following construction: This construction being the same for all of the trays, only that used in conjunction with tray 44 will be described. Formed at the outermost portions of the radial walls 51 and 52 of tray 44 are U-shaped guides 66 and 67. These guides have flanges 68 and 69 spaced from one another to form facing grooves 71 and 72 in the said guides. Slidably mounted in these grooves are two closures 73 and 74 which are of slightly greater length than one-half the length of the trays and which overlap in the middle of the tray. These closures are preferably constructed of celluloid or some other similar transparent plastic material. Secured to one end of the closure 74 is a U-shaped clip 75 which is squeezed on the end of the same. This clip extends between the two flanges 68 and 69 of the guides 66 and 67 and is clear of the same at all positions of the closures. The said clip stiffens the intermediate exposed edge of the closure. Attached to the closure 74 at its opposite end is another clip 76 similar to the clip 75 and forming a cross-bar at the outermost end of the closure. This clip also moves freely between the two flanges 68 and 69 of the guides 66 and 67. The said clip has a finger-piece 77 extending outwardly therefrom and which may be engaged by the user to slide the tray along the two guides 66 and 67. By means of this construction, one-half of the interior of the tray 44 is exposed for access to the articles within the various compartments 62, 63 and 64 within the same.

In order to hold the closures 73 and 74 in closed position, the connecting portions 78 between the flanges 68 and 69 at the ends of the guides 66 and 67 are slit as indicated at 79 in Fig. 6. The said flanges are pinched together as shown in this figure so that when the marginal portion of the closure 73 is brought into engagement therewith, the said flanges have a spring action tending to frictionally engage said closure and to hold the same in position.

For the purpose of utilizing the space above the end compartment 38 and in the upper half 13 of the case 10, clips 82 are secured to the end walls 27 and 28. These clips are adapted to receive part of the articles to be housed within said space. In Fig. 3, we have shown a reel indicated in dotted lines at 83 disposed within said case and with the attaching arms thereof mounted beneath the clip 82. In this manner, all of the space within the case and container is readily available for the keeping of the various articles ordinarily found in a tackle box.

The operation of the device is as follows: After the container 11 has been placed within the case 10 and positioned so that trunnions 58 ride freely in the bearings 59, the box can be used. Toward this end, the closures 73 and 74 are slid one way or the other to give access to the various compartments 62, 63 and 64 within the trays. The articles are placed in or removed from the trays as desired and the closures brought back into closed position. Upon revolving the container 11, the articles within the compartments 62, 63 and 64 are successively brought to view enabling the user to select and easily remove from the container any desired article he chooses. Various articles may also be placed in the end compartments 37 and 38.

The advantages of the invention are manifest. The device provides a maximum number of individual compartments in which various items of fishing tackle such as hooks, lines and baits, etc. may be separately stored to prevent entanglement of the same. With our invention, practically all of the space within the case of the box may be utilized. With a box embodying our invention, the various baits or other items contained within the compartments of the container may be viewed and inspected before the removal of the same. Our improved tackle box is neat and attractive in appearance and has great utility. Whenever desired, the container may be removed from the case of the box for the purpose of inspection or of separately filling the compartments within the same. Our invention can be constructed almost entirely from sheet metal and at an extremely reasonable cost.

Changes in the specific form of our invention, as herein described, may be made within the scope of what is claimed without departing from the spirit of our invention.

Having described our invention, what we claim as new and desire to protect by Letters Patent is:

1. In a tackle box, a revoluble container including trays having radial walls with bottom walls connected thereto and forming compartments within said container opening outwardly in a direction away from the axis of said container, U-shaped guides at the outer edges of said radial walls having spaced flanges forming facing grooves, closures for the trays slidable in said grooves, said flanges at the ends of said grooves being constructed of resilient material and pinched together to frictionally engage said closures to hold the same in their closing positions.

2. In a tackle box, a revoluble container including trays having radial walls with bottom walls connected thereto, U-shaped guides at the outer edges of said radial walls having spaced flanges forming facing grooves, closures for the trays slidable in said grooves, said guides being slit at the ends to separate the flanges, said flanges being pinched together to frictionally engage the closures to hold the same in their extreme positions.

3. In a tackle box, a case comprising a lower portion open at its top, two transverse partitions in said portion of the case spaced from one another and from the end walls of the case, a revoluble container within the case disposed between said partitions, bearings on said partitions open at the upper portions of the same, trunnions on said container journaled in said bearings and removable therefrom upon upward movement of the container, said trunnions having openings in the ends of the same forming finger holes for assisting in the removal of the container from the case.

4. In a tackle box, a revoluble container including trays having radial walls with bottom walls connected thereto and forming compartments within said container opening outwardly in a direction away from the axis of said container, U-shaped guides at the outer edges of said radial walls having spaced flanges forming facing grooves, closures for the trays slidable in said grooves and resilient fingers at the ends of said grooves adapted to frictionally engage the ends of said closures and to hold the same in their closing positions.

GORDON H. TESSMER.
WARREN V. ERICKSON.

REFERENCES CITED

The following references are of record in the file of this patent:

UNITED STATES PATENTS

| Number | Name | Date |
|---|---|---|
| 425,215 | Franklin | Apr. 8, 1890 |
| 821,240 | Herskovitz | May 22, 1906 |
| 1,269,243 | Young | June 11, 1918 |
| 1,552,325 | Loving | Sept. 1, 1925 |
| 1,867,455 | Humphrey | July 12, 1932 |
| 2,138,190 | Myers | Nov. 29, 1938 |
| 2,354,872 | Mitnick | Aug. 1, 1944 |
| 2,441,376 | Stiening | May 11, 1948 |